United States Patent
Mac Brien et al.

[11] Patent Number: 5,513,877
[45] Date of Patent: May 7, 1996

[54] VEHICLE BODY/SUPPLEMENTAL INFLATION RESTRAINT ARRANGEMENT

[75] Inventors: Craig S. Mac Brien, Canton, Mich.; James K. Conlee, Dayton; Laura A. Hawthorn, Vandalia, both of Ohio

[73] Assignee: General Motors Corporation, Detroit, Mich.

[21] Appl. No.: 348,522

[22] Filed: Dec. 2, 1994

[51] Int. Cl.⁶ ................................................ B60R 21/22
[52] U.S. Cl. ........................................ 280/732; 280/743.2
[58] Field of Search .............. 280/743 A, 730 R, 280/729, 732, 743 R, 728 R, 742, 740, 743.2, 743.1, 730.1, 728.1

[56] References Cited

U.S. PATENT DOCUMENTS

| | | | |
|---|---|---|---|
| 3,618,978 | 11/1971 | Klove, Jr. et al. | 280/730 R |
| 3,748,477 | 7/1973 | Wulbrecht | 280/743 R |
| 3,791,671 | 2/1974 | Zens | 280/740 |
| 3,799,573 | 3/1974 | McDonald | 280/740 |
| 4,290,627 | 9/1981 | Cumming et al. | 280/729 |
| 4,300,894 | 11/1981 | Cumming et al. | 280/729 |
| 4,948,168 | 8/1990 | Adomeit et al. | 280/732 |
| 5,022,675 | 6/1991 | Zelenak, Jr. et al. | 280/743 R |
| 5,129,675 | 7/1992 | Wang | 280/743 R |
| 5,149,130 | 9/1992 | Wooley et al. | 280/743 R |
| 5,308,113 | 5/1994 | Moriset | 280/743 A |
| 5,310,214 | 5/1994 | Cuevas | 280/729 |
| 5,380,038 | 1/1995 | Hawthorn et al. | 280/730 R |

FOREIGN PATENT DOCUMENTS

| | | | |
|---|---|---|---|
| 0586131A1 | 3/1994 | European Pat. Off. . | |
| 0593172 | 4/1994 | European Pat. Off. | 280/729 |
| 2322629 | 11/1973 | Germany | 280/743 R |
| 4235761A1 | 4/1994 | Germany . | |

*Primary Examiner*—Margaret A. Focarino
*Assistant Examiner*—Peter C. English
*Attorney, Agent, or Firm*—Ernest E. Helms

[57] ABSTRACT

A supplemental inflatable restraint is provided including an air bag housing positioned in an instrument panel lower surface with an open end extending toward the seated occupant, the open end having a top and a bottom; and an air bag which has a lower lobe for contact with lower extremities of a seated occupant and an upper lobe for contact with the torso of a seated occupant. The upper and lower lobes are separated by a first tether extending from an area generally adjacent to the top of the housing projecting generally toward the seated occupant. The air bag has a pressure restrictor creating a pressure differential between the upper and lower lobes. The upper lobe is subdivided by a second tether from an area adjacent to the top of the housing to an end of the upper lobe generally opposite the lower lobe.

6 Claims, 4 Drawing Sheets

VEHICLE BODY/SUPPLEMENTAL INFLATION RESTRAINT ARRANGEMENT

FIELD OF THE INVENTION

The field of the present invention is that of vehicle interior and supplemental inflation restraint (SIR) arrangements, especially those arrangements utilized to protect non-driving front seat passengers.

BACKGROUND OF THE INVENTION

In order for an SIR to work properly for a passenger who is not seated behind a steering wheel, there must be provided some means to restrain forward movement of the passenger's legs so that the passenger's body moves forward in a position close to that when the passenger is normally seated. This is especially critical when the vehicle passenger is acting in an illegal and unwise manner by not utilizing their belt restraint.

In most vehicles, the downward sloping lower portion of the instrument panel fulfills the knee bolster requirement. This knee bolster must be positioned in the correct area and also must have some ability to give in a front crash situation. Although utilization of the instrument panel as a knee bolster is acceptable from an operational standpoint, it brings about two substantial disadvantages. One disadvantage of utilizing the instrument panel as a knee bolster is that additional space is taken up in the vehicle, denying the front seat passenger leg room. To recover the lost leg room, the total vehicle must be enlarged, or trunk or engine space must be reduced. Secondly, utilization of the instrument panel for a bolster function requires a larger instrument panel than absolutely necessary and thereby adds weight to the vehicle, diminishing the vehicle's environmental efficiency.

SUMMARY OF THE INVENTION

The present invention provides a multi-lobe SIR wherein the air bag has a lower lobe which provides a knee bolster function. Additionally, there is provided a two-part upper lobe which is configured in such a manner that the upper lobe receives all its gaseous intake from the lower lobe via a tether panel which acts as flow restrictor, maintaining pressure in the lower lobe for as long as possible. Additionally, the upper lobe is separated by a secondary tether which ensures maximum contact by the vehicle occupant's torso with the air bag before the air bag can possible contact the occupant's neck or face region. The second tether ensures that contact with the air bag by the occupant's neck or face region is delayed subsequent to contact with the torso, thereby minimizing any reactionary forces which may cause inadvertent injury to the vehicle occupant.

The workings and advantages of the present invention will be further revealed to those skilled in the art by a review of the accompanying drawings and detailed description.

DESCRIPTION OF THE PREFERRED EMBODIMENT

Figure 1:
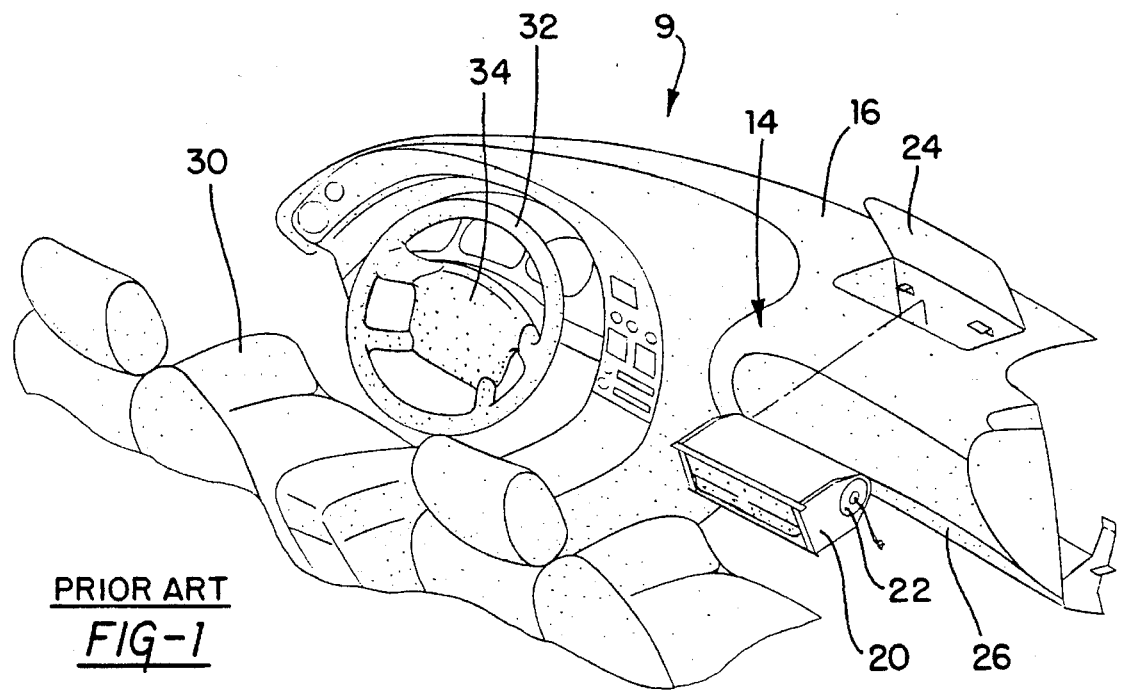
FIG. 1 is a perspective view of a vehicle interior compartment and SIR arrangement prior to the present invention.
Figure 3:
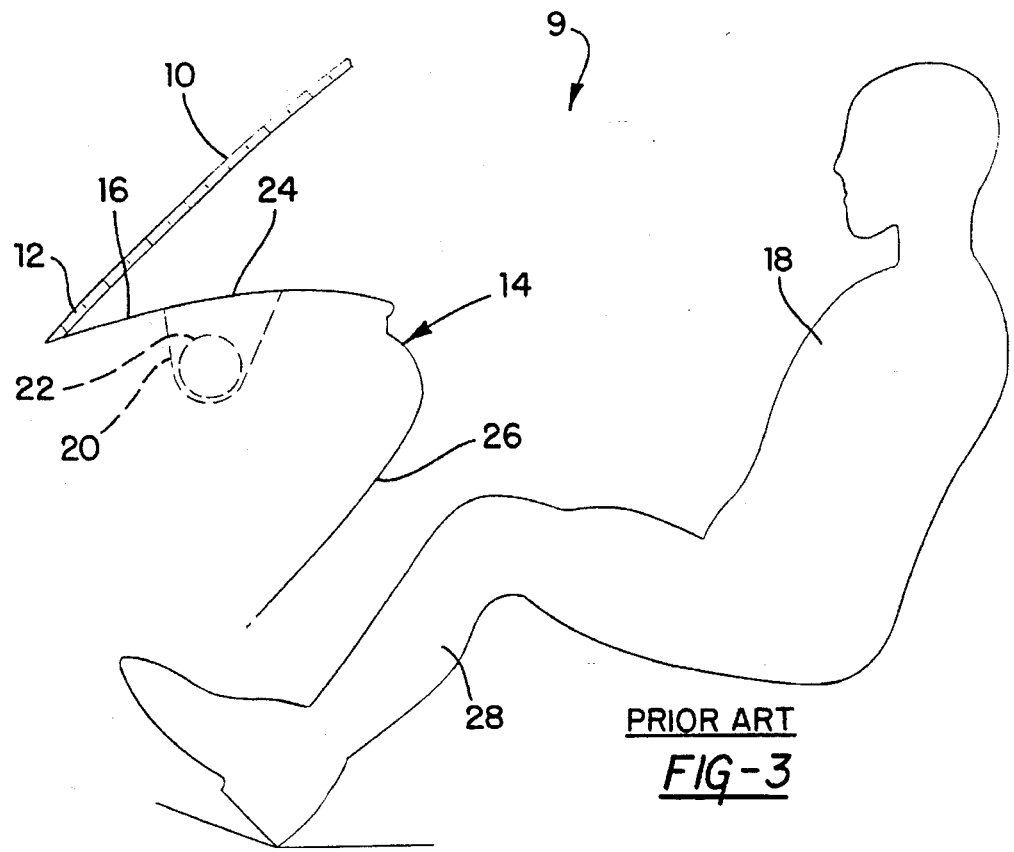
FIG. 3 is a side elevational view with portions sectioned of the arrangement shown in FIG. 1 with a seated occupant.

FIGS. 1 and 3 show a conventional arrangement of a vehicle interior compartment and SIR arrangement 9. The front end of the vehicle compartment is bordered by a windshield 10 having a lower end 12. Adjacent to the lower end of the windshield along the forward part of the vehicle compartment is an instrument panel 14. Instrument panel 14 has a top surface 16 which is adjacent to or connected with the lower end 12 of the windshield and also projects rearwardly toward a seated vehicle occupant 18. Located beneath the top surface 16 of the instrument panel 14 at a height approximating the knee region of a seated occupant is an SIR housing 20 having an inflator can 22 contained therein along a closed end and having an open end covered by a flap 24. The fabric air bag in FIG. 3 has been removed for clarity of illustration.

A lower surface 26 of the instrument panel acts as a knee bolster in a crash situation and has an applicable amount of give (deformation) to prevent or minimize injury to the lower extremities 28 of the seated vehicle occupant 18.

Submarining is virtually totally eliminated on the driver side 30 of the vehicle compartment 9 by virtue of the presence of the steering wheel 32 and the location of the driver side air bag 34, which is hidden by an applicable cover for aesthetic reasons.

Figure 2:
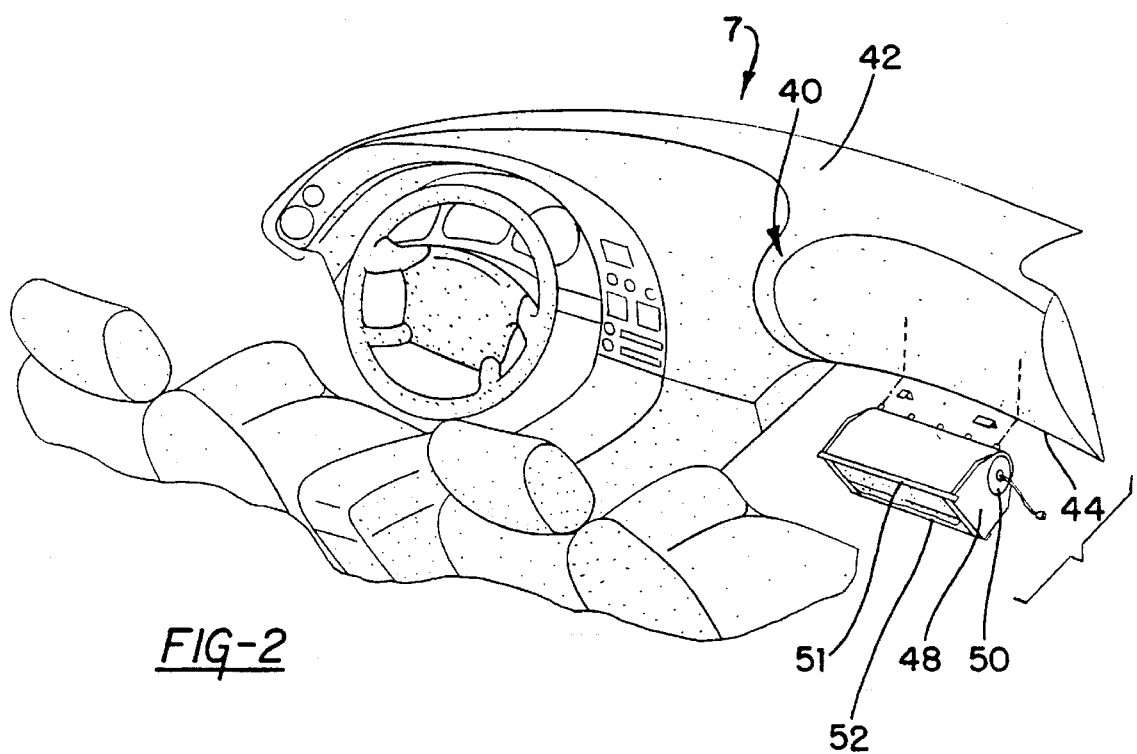
FIG. 2 is a perspective view of a vehicle interior compartment and SIR arrangement according to the present invention.
Figure 4:
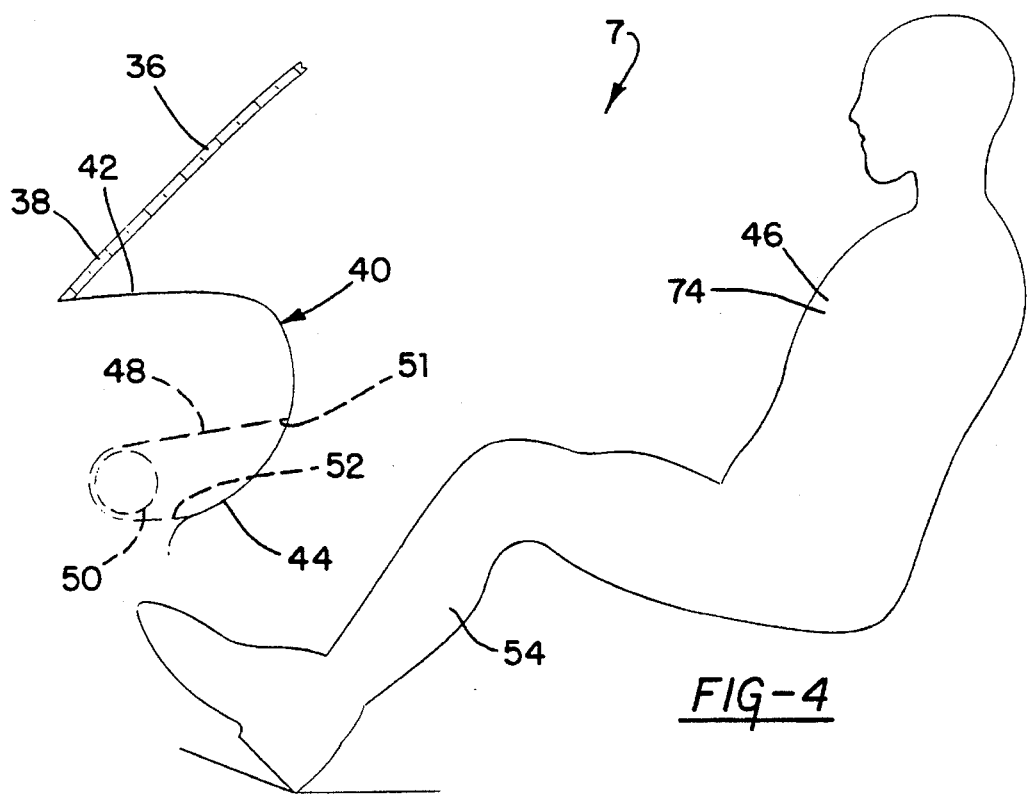
FIG. 4 is a side elevational view with portions sectioned of the arrangement shown in FIG. 2 with a seated occupant.
Figure 5:
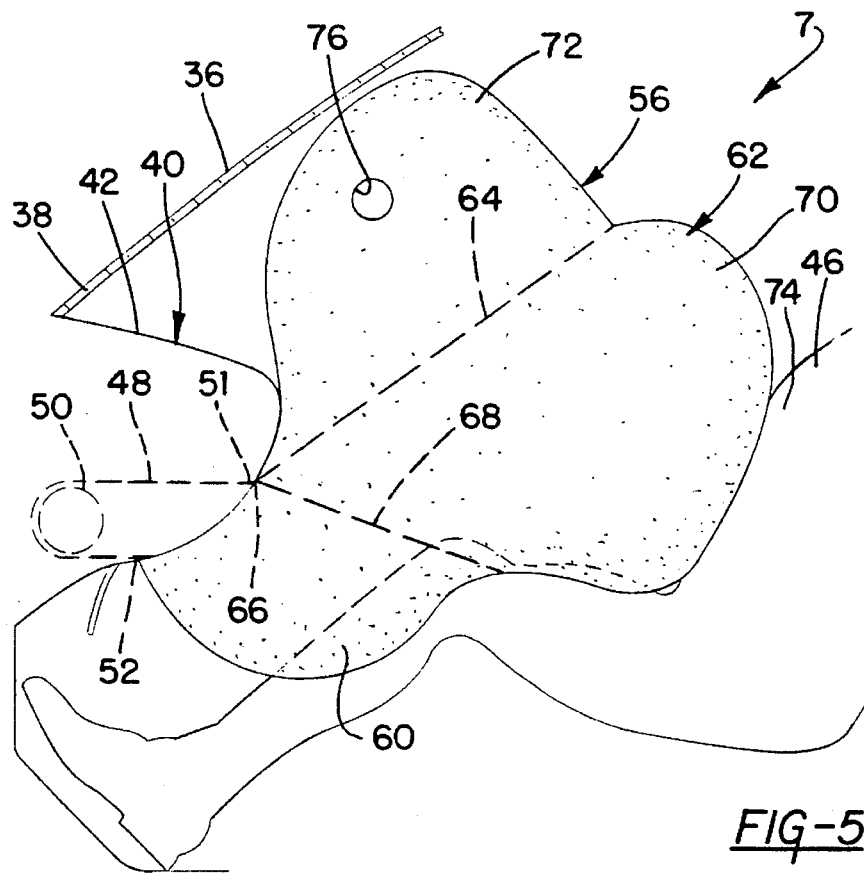
FIG. 5 is a view similar to FIG. 4 demonstrating inflation of the air bag according to the present invention.

Referring to FIGS. 2, 4 and 5, the vehicle compartment and SIR arrangement 7 according to the present invention has a windshield 36 similar to that previously described with a lower end 38. An instrument panel 40 has a top surface 42 and a lower surface 44 which slants downwardly and inclined away from the seated occupant 46. An air bag housing 48 in a similar manner contains an inflator can 50, which under ignition propels an air bag (not shown in FIG. 4) toward the seated occupant 46. The housing has a top edge 51 and a lower edge 52. In a vehicle of similar dimensions, the edge of the instrument panel 40 most adjacent to the lower extremities 54 of the seated occupant is much farther away in the same vehicle than is permissible in the prior art vehicle, as best shown in FIG. 3.

Figure 7:
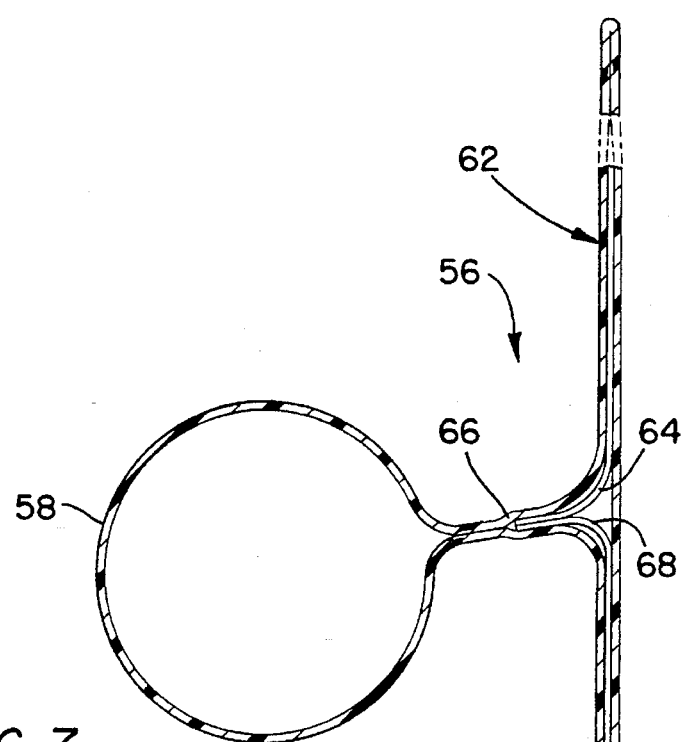
FIGS. 7 and 8 are schematic views showing the folding pattern of the air bag.
Figure 8:
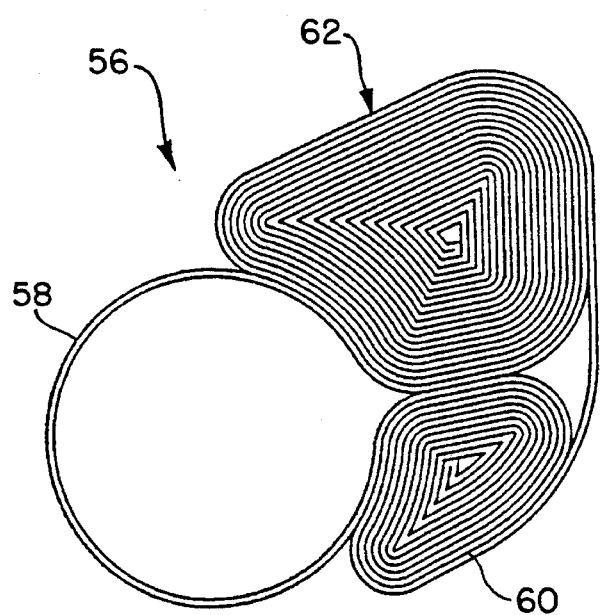

Referring to FIGS. 7 and 8, a schematic view of the folding arrangement of the air bag 56 according to the present invention is provided. The air bag 56 has a central portion 58 which wraps around the can 50 (not shown in FIGS. 7 and 8 for clarity of illustration). The air bag 56 has one portion 60 which provides a lower or knee bolster and a significantly larger upper lobe 62. Joined to the upper lobe 62 at point 66 is an upper tether 64. Additionally, joined to the upper lobe 62 at point 66 or alternatively to the upper tether 64 is a lower panel tether 68. The lower bolster 60 is wrapped in a clockwise angular manner generally facing downwardly, and the upper lobe is folded in a generally counterclockwise manner.

Referring to FIG. 5, in an automotive crash-type situation, a sensor (not shown) will send a signal to cause the inflator 50 to ignite. Gas under pressure will be delivered to the knee bolster lobe 60, causing it to unfurl immediately, contacting the lower extremities of the seated occupant. The lower tether 68 will typically be a solid panel with clearances along the sides. The lower tether 68 provides two functions. First, it extends from the top edge 51 of the housing to a portion of the air bag 56 closely adjacent to the thigh region of the seated occupant, thereby shaping the knee bolster lobe 60. Additionally, the panel provides a pressure barrier between the knee bolster 60 and the upper lobe 62, thereby maximizing the period of time that the knee bolster remains firm. Gas escaping the sides of the panel 68 or (in an alternative not shown) special vents holes provided in the panel 68 will then fill the upper lobe 62. No gas enters the upper lobe 62 except that escaping the knee bolster lobe 60. A second tether 64 extending from an area closely adjacent to the top edge 51 of the housing to an area of the upper lobe generally opposite the knee lobe 60 separates the upper lobe into a first region 70 and a second region 72. Region 72 reacts against the windshield 36. Primary portion 62 engages the torso region 74 of the seated occupant. The provision of the second tether 64 shapes the upper lobe 62 in such a manner that initial engagement is with the torso region of the seated occupant, and substantial compression of the upper lobe 62 will occur before it can ever contact the neck or head region of the seated occupant in a crash situation, thereby minimizing any chance of undesirable levels of contact with the neck or head region of the seated occupant.

The from region 72 of the upper lobe has an optional vent which allows for escaping of gas. In an embodiment not shown, vent 76 is eliminated and the bag is porous enough to allow proper venting.

Figure 6:
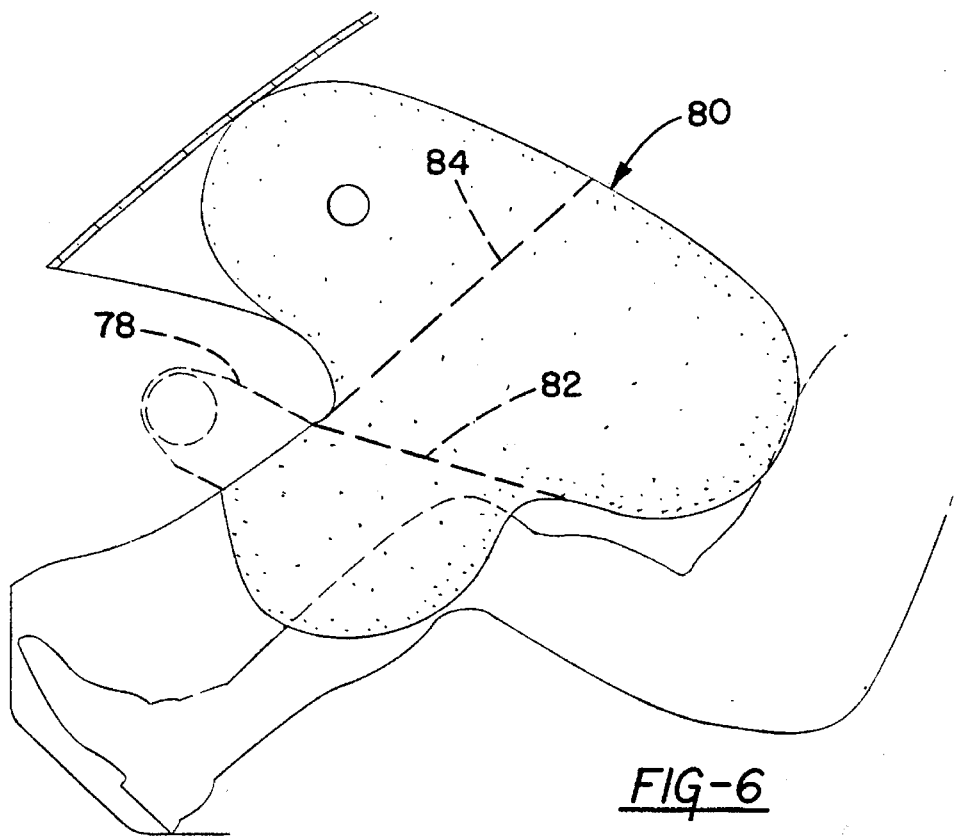
FIG. 6 is a view similar to FIG. 5 demonstrating inflation of an alternate preferred embodiment according to the present invention.

Referring to FIG. 6, an alternative preferred embodiment of the present invention is provided wherein the housing 78 is oriented in a downward incline. Additionally, the air bag 80 has a kidney shape, which is caused by shortening of the panel tether 82 and the secondary tether 84 as compared to the example shown in FIG. 5 and the shape of the side panels from which the air bag 80 is fabricated.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement of a vehicle body and supplemental inflatable restraint comprising:

a vehicle compartment including a space for a non-driving, seated occupant;

a windshield at a forward end of the compartment forming a boundary thereof, the windshield having a lower end;

an instrument panel positioned at a forward end of the compartment adjacent the lower end of the windshield, the instrument panel having an upper surface projecting rearwardly toward a seated occupant and a lower surface with a portion positioned at approximately the height of a knee region of a seated occupant;

an air bag housing positioned in the instrument panel lower surface with an open end extending toward the seated occupant, the open end having a top and a bottom; and an air bag, the air bag having a lower lobe for contact with lower extremities of a seated occupant and the air bag having an upper lobe for contact with the torso of a seated occupant, the upper lobe being significantly larger than the lower lobe, the upper and lower lobes being separated by a first tether extending from an area generally adjacent to the top of the housing projecting generally toward the seated occupant, and the air bag having a pressure restrictor creating a pressure differential between the upper and lower lobes, the upper lobe being subdivided by a second tether extending from an area adjacent to the top of the housing to an end of the upper lobe generally opposite the lower lobe.

2. An arrangement of a vehicle body and supplemental inflatable restraint as described in claim 1 wherein a panel sewn within the air bag provides the first tether and the pressure restrictor between the upper and lower lobes.

3. An arrangement of a vehicle body and supplemental inflatable restraint as described in claim 1 wherein the lower lobe is wrapped within the air bag housing at a first angular orientation and the upper lobe is wrapped in the housing at an angular orientation opposite that of the lower lobe and an inflator can is located within the air bag.

4. An arrangement of a vehicle body and supplemental inflatable restraint as described in claim 1 wherein the upper lobe is configured such that the seat occupant's torso substantially compresses the upper lobe before any contact can be made with the seated occupant's neck or head.

5. An arrangement of a vehicle body and supplemental inflatable restraint as described in claim 1 wherein the air bag housing is inclined downwardly.

6. An arrangement of a vehicle body and supplemental inflatable restraint comprising:

a vehicle compartment including a space for a non-driving, seated occupant;

a windshield at a forward end of the compartment forming a boundary thereof, the windshield having a lower end;

an instrument panel positioned at a forward end of the compartment, the instrument panel having an upper surface generally adjacent the lower end of the windshield projecting rearwardly toward a seated occupant and a lower surface inclined downwardly projecting away from a seated occupant;

an air bag housing positioned in the instrument panel lower surface with an open end extending toward the seated occupant projecting downwardly, the open end of the housing having a top and a bottom;

an inflator can positioned within a closed end of the air bag housing; and an air bag wrapped around the inflator can, the air bag having a knee bolster lobe folded within the housing in a first angular direction, the knee lobe being provided for contact with lower extremities of a seated occupant and the air bag having an upper lobe folded within the housing in an angular direction opposite the angular direction of the knee bolster lobe for contact with the torso of a seated occupant, the upper lobe being significantly larger than the knee bolster lobe, the upper lobe and the knee bolster lobe being separated by a first panel tether extending from an area generally adjacent to the top of the housing projecting generally toward the seated occupant and the panel tether open along its sides creating a pressure boundary differential between the upper and knee bolster lobes, the upper lobe being subdivided by a second tether extending from an area generally adjacent to the top of the housing to an end of the upper lobe generally opposite the knee bolster lobe for ensuring that the air bag contacts the torso of a seated occupant before the seated occupant's neck or head is contacted by the air bag.

* * * * *